United States Patent
Chae et al.

(10) Patent No.: US 12,522,288 B2
(45) Date of Patent: Jan. 13, 2026

(54) APPARATUS FOR STEERING BY WIRE AND OPERATING METHOD THEREOF

(71) Applicant: HL Mando Corporation, Pyeongtaek-si (KR)

(72) Inventors: Hansang Chae, Pyeongtaek-si (KR); Sunggun Lee, Pyeongtaek-si (KR); Jaewoo Lee, Pyeongtaek-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 66 days.

(21) Appl. No.: 18/440,495

(22) Filed: Feb. 13, 2024

(65) Prior Publication Data
US 2025/0196914 A1 Jun. 19, 2025

(30) Foreign Application Priority Data
Dec. 15, 2023 (KR) .......................... 10-2023-0182623

(51) Int. Cl.
*B62D 5/00* (2006.01)
*B62D 5/04* (2006.01)
*B62D 6/00* (2006.01)
*B62D 15/02* (2006.01)

(52) U.S. Cl.
CPC ............. *B62D 6/008* (2013.01); *B62D 5/005* (2013.01); *B62D 5/0469* (2013.01); *B62D 15/021* (2013.01)

(58) Field of Classification Search
CPC ...... B62D 5/005; B62D 5/006; B62D 5/0469; B62D 5/0481; B62D 6/008; B62D 15/021
USPC ........................................... 701/41, 43
See application file for complete search history.

(56) References Cited

U.S. PATENT DOCUMENTS

| | | | |
|---|---|---|---|
| 8,594,891 B2* | 11/2013 | Harder | B62D 6/002 701/41 |
| 2005/0082108 A1* | 4/2005 | Husain | B62D 5/0469 180/402 |
| 2017/0203784 A1* | 7/2017 | Jeannin | B62D 5/0463 |
| 2018/0237062 A1* | 8/2018 | Saal | B62D 5/0469 |
| 2024/0124046 A1* | 4/2024 | Forte | B62D 5/001 |
| 2024/0227916 A1* | 7/2024 | Fehr | B62D 5/0457 |

FOREIGN PATENT DOCUMENTS

KR 10-2020-0047871 A 5/2020

OTHER PUBLICATIONS

Office Action issued on Nov. 19, 2025 for corresponding Korean Patent Application No. 10-2023-0182623, along with an English machine translation (9 pages).

* cited by examiner

*Primary Examiner* — Erick R Solis
(74) *Attorney, Agent, or Firm* — Hauptman Ham, LLP

(57) ABSTRACT

Disclosed are an apparatus for steering by wire and an operating method thereof which detect whether mechanical end stop (MES) enforcing mechanical rotation restriction of a steering wheel has a breakdown based on sensing information of the apparatus for steering by wire to enhance steering stability and prevent an accident due to steering instability.

13 Claims, 4 Drawing Sheets

APPARATUS FOR STEERING BY WIRE AND OPERATING METHOD THEREOF

CROSS-REFERENCE TO RELATED APPLICATIONS

This application claims benefit and priority to Korean Patent Application No. 10-2023-0182623, filed on Dec. 15, 2023, with the Korean Intellectual Property Office, the disclosure of which is incorporated herein in its entirety by reference.

TECHNICAL FIELD

The present disclosure relates to an apparatus for steering by wire and an operating method thereof.

BACKGROUND

A steer-by-wire scheme steering device that connects a steering wheel and a road wheel with each other through an electrical signal is constituted by a steer wheel feedback actuator (SFA) and a road wheel actuator (RWA) unlike a universal steering device. Since an SFA system and an RWA system are not mechanically connected to each other, the SFA system has two limitations so that the steering wheel does not rotate at a predetermined number of turn times or more. First of all, there are mechanical end stop (MES), which is mechanically limited to prevent the steering wheel from being turned with driver's force, and soft end stop (SES), which is limited in terms of software so that the steering wheel can no longer be turned.

In a case where there is only the MES which is mechanically limited, when a variable gear ratio (VGR) function is used in which a location of a steering wheel end is changed according to a vehicle speed, a feeling of the steering wheel end cannot be created to a driver, so the SES is also used.

However, when the breakdown of the MES, which is caused by assembly abnormality, hardware breakdown, etc., the number of turns increases or decreases, the rotation of the steering wheel is blocked (when the number of turns decreases) before the end of the SES, the driver generates force of the end or more according to the SES to turn the steering wheel, and when the steering wheel is rotated more than the conventional hardware specification (when the number of turns increases), steering is not sufficiently achieved, so an accident may occur. In addition, a method needs to be developed, which detects whether the MES has the breakdown in order for the driver to recognize the breakdown of the steering device even when the steering wheel is further turned.

SUMMARY

According to an exemplary embodiment of the present disclosure, an apparatus for steering by wire and an operating method thereof, which detect whether mechanical end stop (MES) enforcing mechanical rotation restriction of a steering wheel has a breakdown based on sensing information of the apparatus for steering by wire.

However, it is to be understood that the object to be achieved by the present disclosure is not limited to the above object and may be variously extended without departing from the spirit and scope of the present disclosure.

An exemplary embodiment of the present disclosure provides an apparatus for steering by wire, which is mounted on a vehicle, and includes mechanical end stop (MES) enforcing mechanical rotation restriction of a steering wheel, and soft end stop (SES) enforcing software rotation restriction of the steering wheel, which includes: a first ECU controlling a steer wheel feedback actuator (SFA), and detecting whether the MES has a breakdown based on sensing information of the apparatus for steering by wire; and a second ECU controlling a road wheel actuator (RWA).

Here, the sensing information may include a steering wheel angle indicating a current angle of the steering wheel, a disturbance torque indicating current mechanical friction of the SFA, and a curb detection result indicating whether a current curb contacts a tire of a vehicle.

Here, the first ECU may acquire the steering wheel angle and the disturbance torque, and detect whether the MES has the breakdown based on the acquired steering wheel angle, the acquired disturbance torque, and the curb detection result provided from the second ECU.

Here, when the steering wheel angle is larger than a first rotation restriction angle according to the SES and the steering wheel angle is larger than a second rotation restriction angle according to the MES, the first ECU may determine that the MES has the breakdown, and the second rotation restriction angle may have a larger value than the first rotation restriction angle.

Here, when the steering wheel angle is smaller than the first rotation restriction angle, the first ECU may detect whether the MES has the breakdown based on the disturbance torque and the curb detection result.

Here, when the disturbance torque is larger than a predetermined reference torque, the first ECU may detect whether the MES has the breakdown based on the curb detection result.

Here, the first ECU may determine that the MES does not have the breakdown when the curb is detected according to the curb detection result, and determines that the MES has the breakdown when the curb is not detected according to the curb detection result.

Here, when the disturbance torque is smaller than the reference torque, the first ECU may determine that the MES does not have the breakdown regardless of the curb detection result.

Here, when the steering wheel angle is larger than the first rotation restriction angle, and the steering wheel angle is smaller than the second rotation restriction angle, the first ECU may determine that the MES does not have the breakdown regardless of the disturbance torque and the curb detection result.

Another exemplary embodiment of the present disclosure provides an operating method of an apparatus for steering by wire, which is mounted on a vehicle, and includes mechanical end stop (MES) enforcing mechanical rotation restriction of a steering wheel, and soft end stop (SES) enforcing software rotation restriction of the steering wheel, which may include: controlling, by a first ECU, a steer wheel feedback actuator (SFA), and acquiring sensing information of the apparatus for steering by wire; and detecting, by the first ECU, whether the MES has a breakdown based on the sensing information.

Here, the sensing information may include a steering wheel angle indicating a current angle of the steering wheel, a disturbance torque indicating current mechanical friction of the SFA, and a curb detection result indicating whether a current curb contacts a tire of a vehicle.

Here, the detecting of whether the MES has the breakdown may be achieved by determining that the MES has the breakdown when the steering wheel angle is larger than a first rotation restriction angle according to the SES and the steering wheel angle is larger than a second rotation restriction angle according to the MES, and the second rotation restriction angle may have a larger value than the first rotation restriction angle.

Here, the detecting of whether the MES has the breakdown may be achieved by detecting whether the MES has the breakdown based on the disturbance torque and the curb detection result when the steering wheel angle is smaller than the first rotation restriction angle.

Here, the detecting of whether the MES has the breakdown may be achieved by detecting whether the MES has the breakdown based on the curb detection result when the disturbance torque is larger than a predetermined reference torque.

Here, the detecting of whether the MES has the breakdown may be achieved by determining that the MES does not have the breakdown when the curb is detected according to the curb detection result, and determining that the MES has the breakdown when the curb is not detected according to the curb detection result.

According to an exemplary embodiment of the present disclosure, an apparatus for steering by wire and an operating method thereof, which detect whether mechanical end stop (MES) enforcing mechanical rotation restriction of a steering wheel has a breakdown based on sensing information of the apparatus for steering by wire to enhance steering stability and prevent an accident due to steering instability.

The effects of various exemplary embodiments of the present disclosure are not limited to the described effects, and it is apparent to those skilled in the art that various effects are inherent in the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
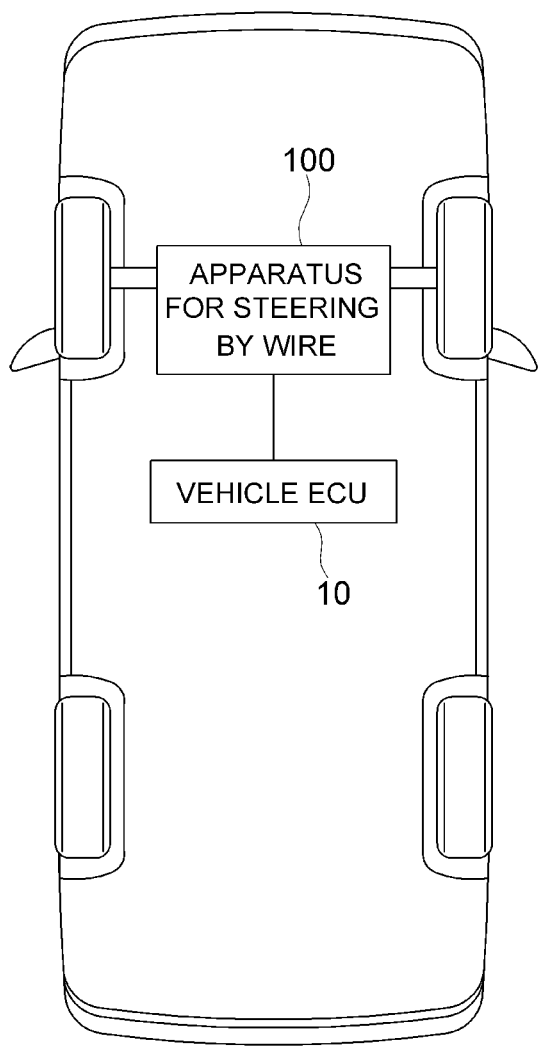
FIG. 1 is a block diagram for describing an apparatus for steering by wire according to an exemplary embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, an exemplary embodiment of the present disclosure will be described in detail with reference to the accompanying drawings. Advantages and features of the present disclosure, and methods for accomplishing the same will be more clearly understood from contents described in detail below with reference to the accompanying drawings. However, the exemplary embodiment of the present disclosure is not limited to the exemplary embodiments posted below, but can be implemented in different forms, and the exemplary embodiments of the present disclosure are defined by the category of the claim.

Throughout the whole specification, the same reference numerals denote the same elements. Unless otherwise defined, all terms (including technical and scientific terms) used in this specification may be used as the meaning which may be commonly understood by the person with ordinary skill in the art, to which the present disclosure pertains. Further, terms defined in commonly used dictionaries should not be interpreted in an idealized or excessive sense unless expressly and specifically defined.

In this specification, the terms "first," "second,", and the like are used to differentiate a certain component from other components, but the scope should not be construed to be limited by the terms. For example, a first component may be referred to as a second component, and similarly, the second component may be referred to as the first component.

In this specification, in each step, reference numerals (e.g., a, b, c, etc.) are used for convenience of description, the reference numerals are not used to describe the order of the steps and unless otherwise stated, it may occur differently from the order specified. That is, the respective steps may be performed similarly to the specified order, performed substantially simultaneously, and performed in an opposite order.

In this specification, expressions such as "have", "can have", "include" or "can include", etc., are the presence of the corresponding features (e.g., components such as, numerical value, function, operation, or element), and the presence of an additional feature is not excluded.

Further, the term "unit" disclosed in the specification means software and hardware components such as field programmable gate array (FPGA) or ASIC and the "unit" performs predetermined roles. However, the "unit" is not a meaning limited to software or hardware. The "unit" may be configured to reside on an addressable storage medium and may be configured to play back one or more processors. Accordingly, as one example, the "unit" includes components such as software components, object oriented software components, class components, and task components, processes, functions, attributes, procedures, subroutines, segments of a program code, drivers, firmware, microcodes, circuitry, data structures, and variables. Functions provided in the components and the "units" may be combined into a smaller number of components and "units" or further separated into additional components and "units".

Hereinafter, an apparatus for steering by wire and an operating method thereof according to an exemplary embodiment of the present disclosure will be described in detail with reference to the accompanying drawings.

First, an apparatus for steering by wire according to an exemplary embodiment of the present disclosure will be described with reference to FIG. 1.

FIG. 1 is a block diagram for describing an apparatus for steering by wire according to an exemplary embodiment of the present disclosure.

Referring to FIG. 1, the apparatus 100 for steering by wire according to an exemplary embodiment of the present disclosure may be mounted on a vehicle, and change a progress direction of the vehicle by a steer-by-wire scheme which connects a steering wheel and a road wheel to each other through an electrical signal according to a control command of a vehicle electronic control unit 10.

In particular, the apparatus 100 for steering by wire as an apparatus 100 for steering by wire, which includes mechanical end stop (MES) and soft end stop (SES) may detect whether the MES has a breakdown based on sensing information of the apparatus 100 for steering by wire. Here, the MES refers to an apparatus which enforces mechanical rotation restriction of the steering wheel. In addition, the SES refers to a module which enforces software rotation restriction of the steering wheel.

As a result, the apparatus 100 for steering by wire can enhance steering stability, and prevent an accident due to steering instability.

Then, the apparatus for steering by wire according to an exemplary embodiment of the present disclosure will be described in more detail with reference to FIGS. 2 and 3.

Figure 2:
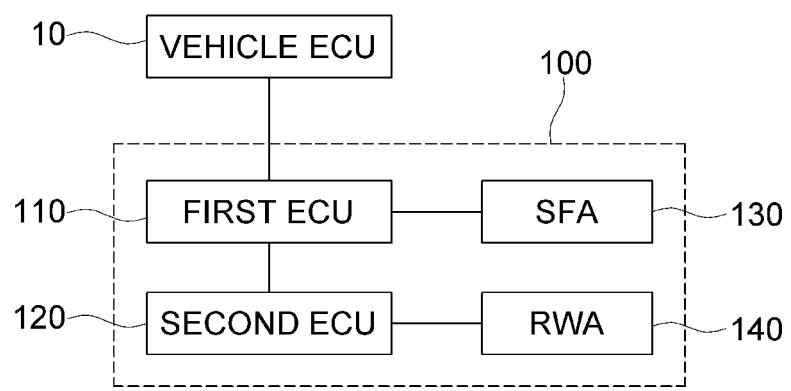
FIG. 2 is a block diagram for describing a configuration of the apparatus for steering by wire illustrated in FIG. 1.
Figure 3:
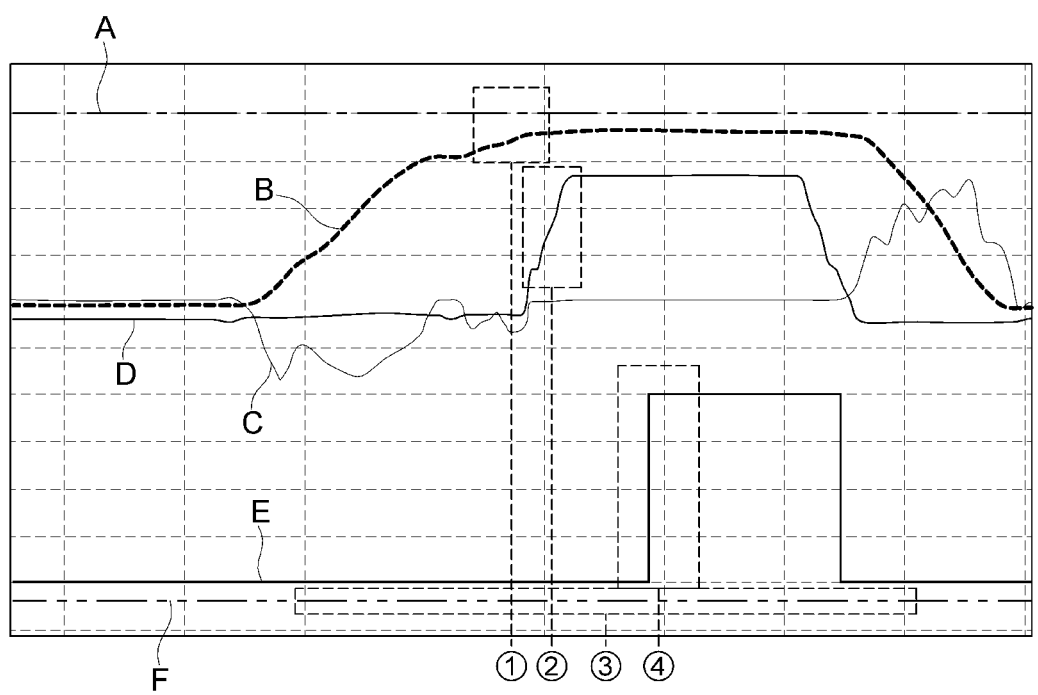
FIG. 3 is a diagram for describing an example of an operation of detecting whether MES has a breakdown according to an exemplary embodiment of the present disclosure.

FIG. 2 is a block diagram for describing a configuration of the apparatus for steering by wire illustrated in FIG. 1 and FIG. 3 is a diagram for describing an example of an operation of detecting whether MES has a breakdown according to an exemplary embodiment of the present disclosure.

Referring to FIG. 2, the apparatus 100 for steering by wire may include a first ECU 110, a second ECU 120, a steer wheel feedback actuator (SFA) 130, and a road wheel actuator (RWA) 140.

The first ECU 110 may control the SFA 130, and detect whether the MES has the breakdown based on the sensing information of the apparatus for steering by wire.

Here, the sensing information may include a steering wheel angle indicating a current angle of the steering wheel, a disturbance torque indicating current mechanical friction of the SFA 130, and a curb detection result indicating whether a current curb contacts a tire of a vehicle.

That is, the first ECU 110 may acquire the steering wheel angle and the disturbance torque. For example, the first ECU 110 may acquire the current angle of the steering wheel based on a torque value sensed through a torque sensor of the SFA 130. For example, the first ECU 110 may acquire disturbance torque indicating a current value of mechanical friction through a friction estimator (not illustrated) of the SFA 130 of the first ECU 110. Moreover, a process of acquiring the steering wheel angle and a process of acquiring the disturbance torque are conventionally known technology, so a detailed description is omitted.

Further, the first ECU 110 may receive a curb detection result from the second ECU 120.

In addition, the first ECU 110 may detect whether the MES has the breakdown based on the steering wheel angle, the disturbance torque, and the curb detection result. In this case, the first ECU 110 may detect whether the MES has the breakdown at an interval of a predetermined period. In addition, when it is determined that the MES has the breakdown, the first ECU 110 may also provide an MES breakdown occurrence message to the vehicle ECU 10.

When described in more detail, when the steering wheel angle is larger than a first rotation restriction angle according to the SES and the steering wheel angle is larger than a second rotation restriction angle according to the MES, the first ECU 110 may determine that the MES has the breakdown. For example, when the steering wheel angle is larger than the second rotation restriction angle according to the MES, the first ECU 110 may determine that the MES has the breakdown due to damage of a fastening portion.

Here, the second rotation restriction angle according to the MES may have a larger value than the first rotation restriction angle according to the SES. For example, the first rotation restriction angle may be set to "360 degrees", and the second rotation restriction angle may be set to "370 degrees".

In addition, when the steering wheel angle is larger than the first rotation restriction angle, and the steering wheel angle is smaller than the second rotation restriction angle, the first ECU 110 may determine that the MES does not have the breakdown regardless of the disturbance torque and the curb detection result.

In addition, when the steering wheel angle is smaller than the first rotation restriction angle, the first ECU 110 may detect whether the MES has the breakdown based on the disturbance torque and the curb detection result.

That is, when the disturbance torque is larger than a predetermined reference torque, the first ECU 110 may detect whether the MES has the breakdown based on the curb detection result. Here, the reference torque may be predetermined to a specific value in advance based on a feature of the apparatus 100 for steering by wire, a feature of the vehicle, etc. For example, the reference torque may be set to "12 Nm". When the curb is detected according to the curb detection result, the first ECU 110 may determine that the MES does not have the breakdown. When the curb is not detected according to the curb detection result, the first ECU 110 may determine that the MES has the breakdown. For example, when a condition is not established in which the tire of the current vehicle contacts the curb, and the disturbance torque is more than the reference toque, the first ECU 110 may determine that the MES has the breakdown due to hardware abnormality, insertion of foreign substances into a decelerator, deformation of a gear unit, assembly abnormality, etc.

On the contrary, when the disturbance torque is smaller than the reference torque, the first ECU 110 may determine that the MES does not have the breakdown regardless of the curb detection result.

In addition, the second ECU 120 may control the RWA 140. Further, the second ECU 120 may check whether the curb is detected, and provide the curb detection result the first ECU 110. In this case, the second ECU 120 may provide the curb detection result to the first ECU 110 when receiving an information providing request from the first ECU 110. Of course, the second ECU 120 may also provide the curb detection result to the first ECU 110 at an interval of a predetermined period regardless of the information providing request from the first ECU 110. Moreover, a process of acquiring the curb detection result indicating whether the curb currently contacts the tire of the vehicle uses the conventionally known technology, so a detailed description is omitted.

For example, it is assumed that the sensing information is acquired as illustrated in FIG. 3. That is, "A" of FIG. 3 represents the first rotation restriction angle according to the SES, "B" of FIG. 3 represents the steering wheel angle, "C" of FIG. 3 represents a motor speed, "D" of FIG. 3 represents the disturbance torque, "E" of FIG. 3 represents whether the MES has the breakdown, and "F" of FIG. 3 represents the curb detection result. In a state (see ① of FIG. 3) in which the steering wheel angle is smaller than the first rotation restriction angle, when the disturbance torque indicating system friction is larger than the reference torque (see ② of FIG. 3), and the curb is not detected (see ③ of FIG. 3), the first ECU 110 may determine that the MES has the breakdown ④ of FIG. 3).

Then, an operating method of an apparatus for steering by wire according to an exemplary embodiment of the present disclosure will be described with reference to FIG. 4.

Figure 4:
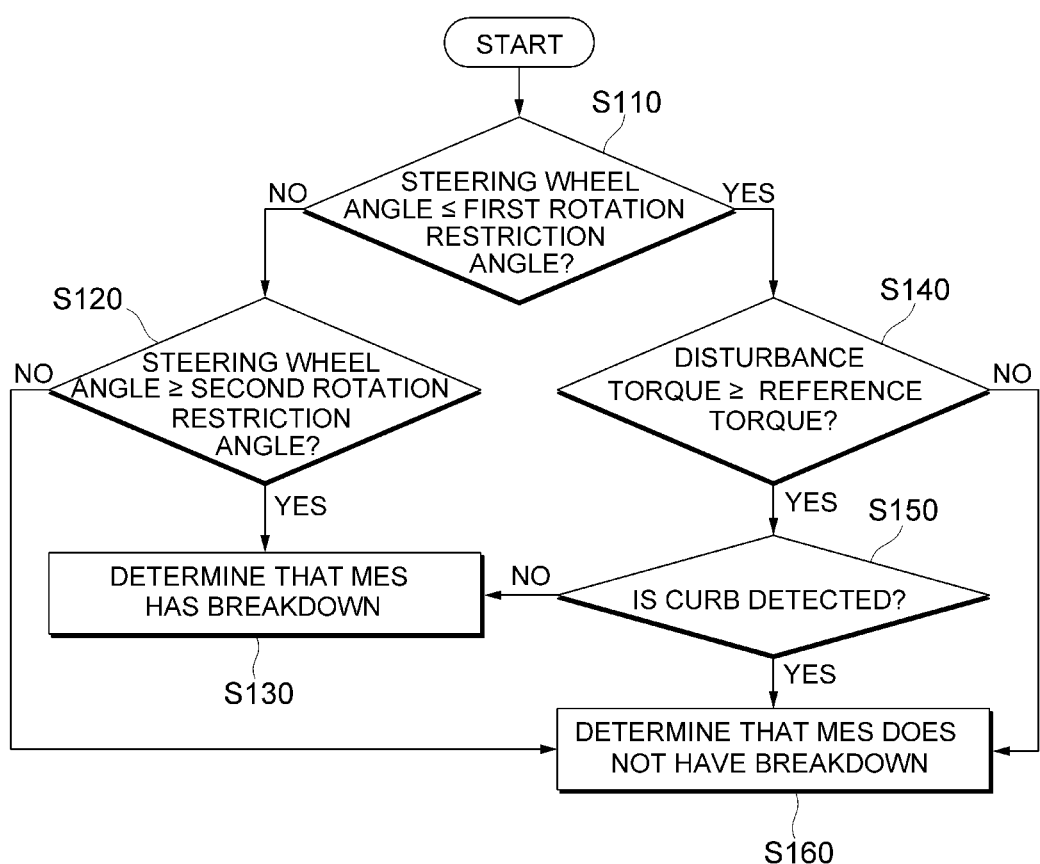
FIG. 4 is a flowchart for describing an operating method of an apparatus for steering by wire according to an exemplary embodiment of the present disclosure.

FIG. 4 is a flowchart for describing an operating method of an apparatus for steering by wire according to an exemplary embodiment of the present disclosure.

A first ECU 110 of an apparatus 100 for steering by wire may acquire sensing information of the apparatus 100 for steering by wire.

Here, the sensing information may include a steering wheel angle indicating a current angle of a steering wheel, a disturbance torque indicating current mechanical friction of an SFA 130, and a curb detection result indicating whether a current curb contacts a tire of a vehicle.

Then, the first ECU 110 may detect whether MES has a breakdown based on the sensing information.

When described in more detail with reference to FIG. 4, when the steering wheel angle is larger than a first rotation restriction angle according to the SES (S110-N) and the steering wheel angle is larger than a second rotation restriction angle according to the MES (S120-Y), the first ECU 110 may determine that the MES has the breakdown (S130).

In addition, when the steering wheel angle is larger than the first rotation restriction angle (S110-N), and the steering wheel angle is smaller than the second rotation restriction angle (S120-N), the first ECU 110 may determine that the MES does not have the breakdown regardless of the disturbance torque and the curb detection result (S160).

In addition, when the steering wheel angle is smaller than the first rotation restriction angle (S110-Y), the first ECU 110 may detect whether the MES has the breakdown based on the disturbance torque and the curb detection result.

That is, when the disturbance torque is larger than a predetermined reference torque (S140-Y), the first ECU 110 may detect whether the MES has the breakdown based on the curb detection result. More specifically, when the curb is detected according to the curb detection result (S150-Y), the first ECU 110 may determine that the MES does not have the breakdown (S160). When the curb is not detected according to the curb detection result (S150-Y), the first ECU 110 may determine that the MES has the breakdown (S130).

On the contrary, when the disturbance torque is smaller than the reference torque (S140-N), the first ECU 110 may determine that the MES does not have the breakdown regardless of the curb detection result (S160).

The operations according to the exemplary embodiments of the present disclosure described above are implemented in a form of a program command which may be performed through various computer means and may be recorded in the computer-readable storage medium. The computer-readable storage medium represents any medium that participates in providing an instruction to a processor for execution. The computer-readable storage medium may include a program command, a data file, or a data structure or a combination thereof. For example, the computer-readable storage medium may include a magnetic medium, an optical recording medium, a memory, and the like. A computer program may be distributed on a networked computer system so that a computer readable code may be stored and executed in a distributed manner. Functional programs, codes, and code segments for implementing the exemplary embodiments of the present disclosure may be easily inferred by programmers in the art to which the exemplary embodiments of the present disclosure belong.

The exemplary embodiments of the present disclosure are for describing the technical spirit of the exemplary embodiments, and the scope of the technical spirit of the exemplary embodiment is not limited by the exemplary embodiment of the present disclosure. The protection scope of the exemplary embodiments of the present disclosure should be interpreted by the appended claims and all technical spirit in the equivalent range thereto should be interpreted to be embraced by the claims of the exemplary embodiment of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An apparatus for steering by wire, which is mounted on a vehicle, and includes a mechanical end stop (MES) enforcing mechanical rotation restriction of a steering wheel, and a soft end stop (SES) enforcing software rotation restriction of the steering wheel, comprising:
    a first ECU controlling a steer wheel feedback actuator (SFA), and detecting whether the MES has a breakdown based on sensing information of the apparatus for steering by wire; and
    a second ECU controlling a road wheel actuator (RWA), wherein the sensing information includes a steering wheel angle indicating a current angle of the steering wheel, a disturbance torque indicating current mechanical friction of the SFA, and a curb detection result indicating whether a street curb contacts a tire of a vehicle.

2. The apparatus for steering by wire of claim 1, wherein the first ECU acquires the steering wheel angle and the disturbance torque, and detects whether the MES has the breakdown based on the acquired steering wheel angle, the acquired disturbance torque, and the curb detection result provided from the second ECU.

3. The apparatus for steering by wire of claim 2, wherein when the steering wheel angle is larger than a first rotation restriction angle according to the SES and the steering wheel angle is larger than a second rotation restriction angle according to the MES, the first ECU determines that the MES has the breakdown, and
    the second rotation restriction angle has a larger value than the first rotation restriction angle.

4. The apparatus for steering by wire of claim 3, wherein when the steering wheel angle is smaller than the first rotation restriction angle, the first ECU detects whether the MES has the breakdown based on the disturbance torque and the curb detection result.

5. The apparatus for steering by wire of claim 4, wherein when the disturbance torque is larger than a predetermined reference torque, the first ECU detects whether the MES has the breakdown based on the curb detection result.

6. The apparatus for steering by wire of claim 5, wherein the first ECU determines that the MES does not have the breakdown when the curb is detected according to the curb detection result, and determines that the MES has the breakdown when the curb is not detected according to the curb detection result.

7. The apparatus for steering by wire of claim 5, wherein when the disturbance torque is smaller than the reference torque, the first ECU determines that the MES does not have the breakdown regardless of the curb detection result.

8. The apparatus for steering by wire of claim 4, wherein when the steering wheel angle is larger than the first rotation restriction angle, and the steering wheel angle is smaller than the second rotation restriction angle, the first ECU determines that the MES does not have the breakdown regardless of the disturbance torque and the curb detection result.

9. An operating method of an apparatus for steering by wire, which is mounted on a vehicle, and includes a mechanical end stop (MES) enforcing mechanical rotation restriction of a steering wheel, and a soft end stop (SES) enforcing software rotation restriction of the steering wheel, comprising:
controlling, by a first ECU, a steer wheel feedback actuator (SFA), and acquiring sensing information of the apparatus for steering by wire; and
detecting, by the first ECU, whether the MES has a breakdown based on the sensing information,
wherein the sensing information includes a steering wheel angle indicating a current angle of the steering wheel, a disturbance torque indicating current mechanical friction of the SFA, and a curb detection result indicating whether a street curb contacts a tire of a vehicle.

10. The operating method of claim 9, wherein the detecting of whether the MES has the breakdown is achieved by determining that the MES has the breakdown when the steering wheel angle is larger than a first rotation restriction angle according to the SES and the steering wheel angle is larger than a second rotation restriction angle according to the MES, and the second rotation restriction angle has a larger value than the first rotation restriction angle.

11. The operating method of claim 10, wherein the detecting of whether the MES has the breakdown is achieved by detecting whether the MES has the breakdown based on the disturbance torque and the curb detection result when the steering wheel angle is smaller than the first rotation restriction angle.

12. The operating method of claim 11, wherein the detecting of whether the MES has the breakdown is achieved by detecting whether the MES has the breakdown based on the curb detection result when the disturbance torque is larger than a predetermined reference torque.

13. The operating method of claim 12, wherein the detecting of whether the MES has the breakdown is achieved by determining that the MES does not have the breakdown when the curb is detected according to the curb detection result, and determining that the MES has the breakdown when the curb is not detected according to the curb detection result.

* * * * *